US012668517B2

(12) United States Patent
Huang et al.

(10) Patent No.: US 12,668,517 B2
(45) Date of Patent: Jun. 30, 2026

(54) FUNCTIONALIZED PHOSPHONATES, AND WATER-SOLUBLE SALTS AND N-OXIDE DERIVATIVES THEREOF, AND METHOD OF USE THEREOF AS SCALE INHIBITOR

(71) Applicant: DORF KETAL BRASIL LTDA, BRAZIL, Nova Santa Rita (BR)

(72) Inventors: Chun Te Huang, Nova Santa Rita (BR); Rubens Bisatto, Nova Santa Rita (BR); Fernanda Fiegenbaum, Nova Santa Rita (BR); Carlos Rodolfo Wolf, Nova Santa Rita (BR)

(73) Assignee: DORF KETAL BRASIL LTDA, BRAZIL, Nova Santa Rita (BR)

( * ) Notice: Subject to any disclaimer, the term of this patent is extended or adjusted under 35 U.S.C. 154(b) by 132 days.

(21) Appl. No.: 18/683,601

(22) PCT Filed: Aug. 10, 2022

(86) PCT No.: PCT/IB2022/057463
§ 371 (c)(1),
(2) Date: Feb. 14, 2024

(87) PCT Pub. No.: WO2023/021375
PCT Pub. Date: Feb. 23, 2023

(65) Prior Publication Data

US 2024/0351930 A1 Oct. 24, 2024

(30) Foreign Application Priority Data

Aug. 14, 2021 (IN) ............................ 202111036917

(51) Int. Cl.
*C02F 5/14* (2023.01)
*C02F 103/02* (2006.01)
*C02F 103/36* (2006.01)

(52) U.S. Cl.
CPC .......... *C02F 5/14* (2013.01); *C02F 2103/023* (2013.01); *C02F 2103/365* (2013.01); *C02F 2303/22* (2013.01)

(58) Field of Classification Search
CPC .................. C02F 5/14; C02F 2103/023; C02F 2103/365; C02F 2303/22
See application file for complete search history.

(56) References Cited

U.S. PATENT DOCUMENTS 4,080,375 A 3/1978 Quinlan
4,085,134 A 4/1978 Redmore
4,187,245 A 2/1980 Redmore
4,931,189 A 6/1990 Dhawan
4,973,744 A * 11/1990 Hwa ..................... C07F 9/3817 562/12
5,096,595 A * 3/1992 Hwa ................... C23F 11/1676 210/699
5,167,866 A * 12/1992 Hwa ......................... C02F 5/14 562/12

(Continued)

FOREIGN PATENT DOCUMENTS

EP 0516382 A1 12/1992

OTHER PUBLICATIONS

Foreign Communication from Related Application—International Preliminary Report on Patentability of the International Searching Authority, International Application No. PCT/IB2022/057463, dated Nov. 6, 2023, 8 pages.
Foreign Communication from Related Application—Written Opinion of the International Searching Authority, International Application No. PCT/IB2022/057463, dated Feb. 23, 2023, 6 pages.

*Primary Examiner* — Haidung D Nguyen
(74) *Attorney, Agent, or Firm* — Conley Rose, P.C.; Rodney B. Carroll

(57) ABSTRACT

The present invention relates to a composition comprising functionalized phosphonate, and water-soluble salt and N-oxide derivatives thereof, and method of use thereof as scale inhibitor. Particularly, the present invention relates to a composition comprising functionalized methylene phosphate of amino-terminated 52xyalkylated, a water-soluble salt thereof, a N-oxide salt thereof, or a water-soluble N-oxide salt thereof as scale inhibitor to prevent scales formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly to prevent scales formed due to deposition of calcium carbonate, calcium sulfate, barium sulfate, strontium sulfate, magnesium sulfate, or a mixture thereof at a different temperature and pressure in high salinity medium including brine environment. Particularly, the present invention also relates to method of use of a composition comprising functionalized methylene phosphonate of amino-terminated oxyalkylate, a water-soluble salt thereof, a N-oxide salt thereof, or a water-soluble N-oxide salt thereof as scale inhibitor to prevent scales formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly to prevent scales formed due to deposition of calcium carbonate, calcium sulfate, barium sulfate, strontium sulfate, magnesium sulfate, or a mixture thereof at a different temperature and pressure in high salinity medium including brine environment.

20 Claims, 1 Drawing Sheet

(56) References Cited

U.S. PATENT DOCUMENTS

| | | | | | |
|---|---|---|---|---|---|
| 5,259,974 | A | | 11/1993 | Chen | |
| 5,378,368 | A | | 1/1995 | Gill | |
| 5,707,529 | A | * | 1/1998 | Gill | C23F 14/02<br>422/15 |
| 6,083,403 | A | * | 7/2000 | Tang | C02F 5/14<br>210/764 |
| 2006/0113505 | A1 | | 6/2006 | Przybylinski | |

* cited by examiner

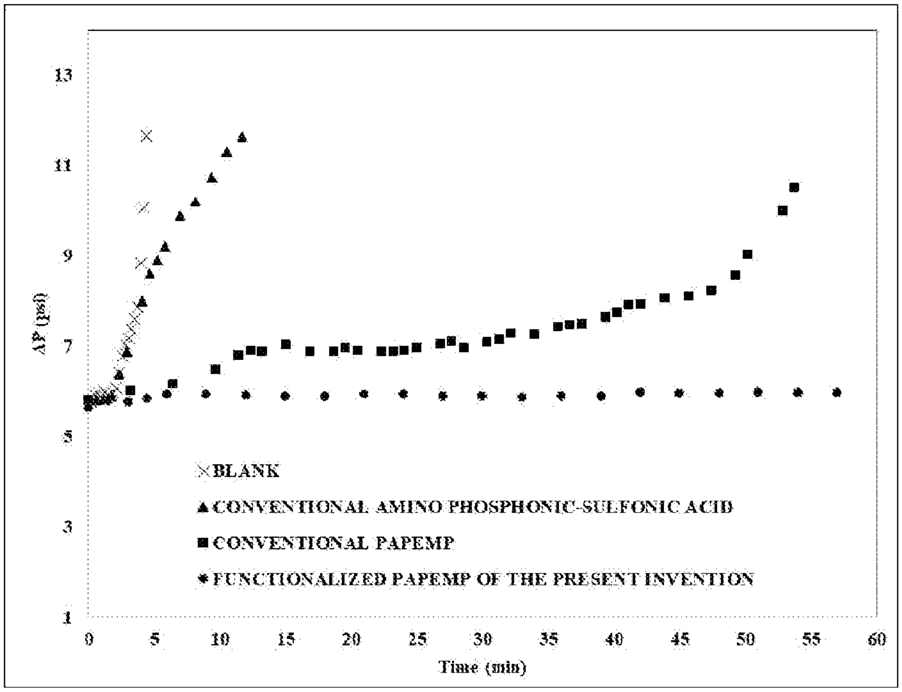
ΔP (psi)
Time (min)
BLANK
CONVENTIONAL AMINO PHOSPHONIC-SULFONIC ACID
CONVENTIONAL PAPEMP
FUNCTIONALIZED PAPEMP OF THE PRESENT INVENTION

FUNCTIONALIZED PHOSPHONATES, AND WATER-SOLUBLE SALTS AND N-OXIDE DERIVATIVES THEREOF, AND METHOD OF USE THEREOF AS SCALE INHIBITOR

TECHNICAL FIELD OF THE INVENTION

The present invention relates to a composition comprising functionalized phosphonate, water-soluble salt, N-oxide salt thereof, and method of use thereof as scale inhibitor.

Particularly, the present invention relates to a composition comprising functionalized methylene phosphonate of amino-terminated oxyalkylate, water-soluble salt thereof, a N-oxide salt thereof, or a water-soluble N-oxide salt thereof as scale inhibitor to prevent scales formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly to prevent scales formed due to deposition of calcium carbonate, calcium sulfate, barium sulfate, strontium sulfate, magnesium sulfate, or a mixture thereof at a different temperature and pressure in high salinity medium including brine environment.

Particularly, the present invention also relates to method of use of a composition comprising functionalized methylene phosphonate of amino-terminated oxyalkylate, a water-soluble salt thereof, a N-oxide salt thereof, or a water-soluble N-oxide salt thereof as scale inhibitor to prevent scales formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly to prevent scales formed due to deposition of calcium carbonate, calcium sulfate, barium sulfate, strontium sulfate, magnesium sulfate, or a mixture thereof at a different temperature and pressure in high salinity medium including brine environment.

BACKGROUND OF THE INVENTION

Scale formation is one of the most critical flow assurance problems found in the upstream oil and gas industry. During the extraction of oil and gas, salt water is also produced. The produced salt water frequently contains dissolved solids, which can have a concentration of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof. When combinations of these cations and anions are present in concentrations that exceed the solubility of their reaction products, a condition of supersaturation is achieved, then a solid phase of salt will form as a precipitate. Precipitation of the reaction product will occur until the solubility product concentrations of the constituent ions are no longer exceeded. For example, when concentrations of calcium and carbonate ion exceed the solubility of their corresponding salt reaction product, a solid phase of calcium carbonate will form as a scale.

The common inorganic scales found in the oil and gas industry are calcium carbonate (calcite and aragonite) and sulfate salts of calcium (gypsum), strontium (celestite), and barium (barite), and the scale would depend upon a geological reservoir rock composition.

There are several thermodynamic driving forces that may be responsible for producing a condition of supersaturation, such as evaporation of the aqueous phase, pH change, amount of dissolved solids, mixing of incompatible waters and changes in the pressure or temperature of the system.

The precipitation of the mineral scales causes damages through the production system and, therefore, loss of well productivity. Over time, as the scales grow, the production rate decreases and even the whole operation has to be forced to stop.

Several techniques are being applied in the oilfield to manage the problem of inorganic scale formation by employing scale inhibitor.

The scale inhibitor can prevent or delay precipitation of scales in supersaturated solutions, through crystal distortion, dispersion and/or threshold effect. Conventional compounds that are being used as scale inhibitor comprise phosphonates, polyphosphates and polymeric electrolytes. Threshold scale inhibitors can exert their action through adsorption at active growth sites on the growing crystal nucleus.

Phosphonates act by threshold effect to prevent scale nucleation and growth at catalytic amount that are less than stoichiometric ratio to scale forming cation, however, such behavior does not occur with sequestering or chelating agents. For example, sequestering or chelating requires an amount many times of active compounds as much as cation, by stoichiometric reaction, and these amounts are not always desirable or economical. In quantitative terms, sequestering takes place at a weight ratio of threshold active compound to scale forming cation component of greater than about 10 to about 1. Generally, threshold inhibition takes place at a weight ratio of active compound to scale forming cation component of less than about 0.5 to about 1. A compound that has sequestering power does not necessarily have threshold inhibiting properties and threshold inhibitor not necessarily acts as sequestering agent.

Phosphonates, as scale inhibitors are particularly useful for aqueous systems, which present great versatility in their chemical structure, and can be found as both non-polymeric and polymeric molecules.

U.S. Pat. Nos. 4,080,375 and 4,931,189 disclose methylene phosphonates of amino-terminated oxyalkylates, also referred as polyamino polyether methylene phosphonate or PAPEMP for inhibition of scale in high brine environments.

U.S. Pat. Nos. 4,085,134 and 4,187,245 describe use of phosphonic acid having pendant sulfonic acid groups for chelation, scale and corrosion inhibition. The addition of the sulfonic group has exhibited the phosphonate's calcium tolerances.

The prior art discloses phosphonates particular for water treatment applications, however these known phosphonates including conventional PAPEMPs have disadvantages in treating water under certain conditions, including brine compatibility in a medium with high ionic forces or high calcium condition.

NEED OF THE INVENTION

Therefore, there is still a need to provide scale inhibition composition which can prevent scales formation due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly which can prevent scales formation due to deposition of calcium carbonate, calcium sulfate, barium sulfate, strontium sulfate, magnesium sulfate, or a mixture thereof not only at high temperatures and pressure, but also in high salinity medium and under high brine environment.

Therefore, there is also a need to provide scale inhibition composition which can demonstrate improved bivalent ions tolerance, wherein the bivalent ions may be selected from a group comprising: calcium (Ca), strontium (Sr), barium (Ba), or a mixture thereof, hence there is also a need to provide scale inhibition composition which is capable of demonstrating substantially improved bivalent ions tolerance, preferably substantially improved calcium (Ca) tolerance, strontium (Sr) tolerance, barium (Ba) tolerance magnesium (Mg) tolerance even at high temperatures and under high brine environments.

Therefore, there is also a need to provide scale inhibition composition which can be effective as a threshold scale inhibitor, chelation agent or sequestration agent of metal ions, and dispersant in industrial cooling water, boiler water, oil well process water and other process waters.

Problem to be Solved by the Invention

Accordingly, aim of the present invention is to solve the problems of the prior art by providing scale inhibition compositions capable of preventing formation of scales due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly capable of preventing formation of scales due to deposition of calcium carbonate, calcium sulfate, barium sulfate, strontium sulfate, magnesium sulfate, or a mixture thereof not only at a high temperature and pressure, but also in low, medium and high salinity media and also under low, medium and high brine environments.

Objects of the Invention

Therefore, main object of the present invention is to provide scale inhibition compositions which are capable of preventing formation of scales due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly which are capable of preventing formation of scales due to deposition of calcium carbonate, calcium sulfate, barium sulfate, strontium sulfate, magnesium sulfate, or a mixture thereof not only at a high temperature and pressure, but also in low, medium and high salinity media and also under low, medium and high brine environments.

Accordingly, another object of the present invention is to provide scale inhibition compositions having improved bivalent ions tolerance, wherein the bivalent ions may be selected from a group comprising: calcium (Ca), strontium (Sr), barium (Ba), magnesium (Mg), or a mixture thereof, hence there is also another object of the present invention to provide scale inhibition compositions which are capable of demonstrating substantially improved bivalent ions tolerance, preferably substantially improved calcium (Ca) tolerance, strontium (Sr) tolerance, barium (Ba) tolerance, magnesium (Mg) tolerance, not only at a high temperature and pressure, but also in low, medium and high salinity media and also under low, medium and high brine environments.

Accordingly, still another object of the present invention is to provide scale inhibition compositions which are effective as a threshold scale inhibitor, chelation agent or sequestration agent in oilfield application, and dispersant in industrial cooling water, boiler water, oil well process water and other process waters.

The other objects and the embodiments of the present invention, and technical advantages thereof resulting in technical advancement over the known art would be more apparent from the following description which has been described with reference to the accompanying figures. It may be noted that the accompanying FIGURE has been incorporated merely for the sake of illustrating the present invention and not with an intention to limit a scope of the present invention.

BRIEF DESCRIPTION OF THE ACCOMPANYING FIGURE

FIG. 1 illustrates the comparative dynamic scale loop (DSL) test results of salt of functionalized methylene phosphonates of amino-terminated oxyalkylates of the present invention, conventional functionalized amino phosphonate, conventional PAPEMP and blank sample (i.e., without scale inhibitor), wherein the results have been expressed in differential pressure as a function of time.

SUMMARY OF THE INVENTION

With aim to overcome the existing problems of the prior art, the inventors have found that if a composition comprising a functionalized methylene phosphonate of amino-terminated oxyalkylate or a corresponding water-soluble salt thereof or a corresponding N-oxide salt thereof, or a water-soluble N-oxide salt thereof is employed during extraction of an oil and/or a gas in oilfield application, then, surprisingly and unexpectedly, the formation of scales due to deposition of alkaline earth metal cations along with anions, particularly the formation of scales due to deposition of calcium carbonate, calcium sulfate, barium sulfate, strontium sulfate, magnesium sulfate, or a mixture thereof is either eliminated or at least substantially reduced not only at a wide range of temperature and pressure but also in low, medium and high salinity media and also under low, medium and high brine environments. The inventors have also found that the composition comprising a functionalized methylene phosphonate of amino-terminated oxyalkylate or a corresponding water-soluble salt thereof or a corresponding N-oxide salt thereof, or a corresponding water-soluble N-oxide salt thereof is, surprisingly and unexpectedly, also effective as: (A) threshold scale inhibitor, (B) crystal modification additive, (C) dispersant, (D) chelation agent, and (E) sequestration agent of metal ions.

The inventors have found that the composition comprising a functionalized methylene phosphonate of amino-terminated oxyalkylate or a corresponding water-soluble salt thereof or a N-oxide salt thereof, or a water-soluble N-oxide salt thereof is effective as scale inhibitor, that means is, surprisingly and unexpectedly, effective to prevent scale deposition, and if the scales are being deposited then it is capable to reduce the scales being formed, or is capable to delay precipitation of the scales in supersaturated solutions, hence, it is capable of acting in different mechanisms separately or in combination thereof.

The inventors have found that the composition comprising a functionalized methylene phosphonate of amino-terminated oxyalkylate or a corresponding water-soluble salt thereof or a N-oxide salt thereof, or a water-soluble N-oxide salt thereof is, surprisingly and unexpectedly, effective as:

(A) threshold scale inhibitor, (B) as crystal modification additive, (C) as dispersant in catalytic amount.

On the other hand, when the composition comprising a functionalized methylene phosphonate of amino-terminated oxyalkylate or a corresponding water-soluble salt thereof or a N-oxide salt thereof, or a water-soluble N-oxide salt thereof is effective as sequestering agent or as chelating agent then its amount may be required many times of the active compounds as much as cation, by stoichiometric reaction, however, such amount may not always be desirable or economical. The difference between the chelating agent and the sequestering agent is that the chelating agent is capable of enveloping a single metal ion at a time while the sequestering agent is capable of binding multiple ions at a time.

Accordingly, in first embodiment, the present invention relates to a novel composition comprising functionalized methylene phosphonate of amino-terminated oxyalkylate, wherein the functionalized methylene phosphonate of amino-terminated oxyalkylate has a general Formula-I:

Formula-I

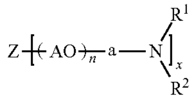

wherein:

- Z is selected from hydrogen atom, etheric oxygen atom, hydroxyl, alkyl, aryl, cycloalkyl, heretocyclyl, hydrocarbylene, heterocarbylene, or an organoheteryl having from 1 to 6 carbons;
- n is an integer or fractional integer;
- A is a lower alkylene group;
- a is a lower alkylene group;
- x is integer having a value from 1 to 4;
- $R^1$ and $R^2$ are independently selected from hydrogen, $—CH_2PO_3M_2$, and a functional group;
- wherein n defines the number of oxyalkylene units in the functionalized methylene phosphonate of amino-terminated oxyalkylate;
- wherein A is selected from methylene, ethylene, propylene, butylene, methyl ethylene, or a combination thereof;
- wherein a is selected from methylene, ethylene, propylene, butylene, methyl ethylene, or ethyl ethylene;
- wherein the functional group is selected from —YCOM, $—YCO_2M$, $—YSO_3M$, $—YSO_2M$, $—YCONM_2$, —YCN, $—YNO_2$, or a combination thereof;
- wherein Y is independently selected from an hydrocarbylene, arylene or heterocarbylene selected from methylene, ethylene, propylene, propenyl, 2-methyl-propylene, butylene or 2-hydroxy-propyl, 2-methyl-2-(propionamido)propane, phenylene;
- wherein M is independently selected from hydrogen, an alkali metal, alkaline earth metal, ammonium salt, ammonium derivative or lower alkyl group, or a combination thereof;
- wherein the functionalized methylene phosphonate of amino-terminated oxyalkylate has at least combination of $—CH_2PO_3M_2$ with one or more functional group.

Accordingly, in second embodiment, the present invention relates to a novel composition comprising water-soluble salt of the functionalized methylene phosphonate of amino-terminated oxyalkylate of the general Formula-I of the first embodiment:

Formula-I

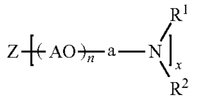

wherein Z, n, A, a, x, $R^1$ and $R^2$, and functional group and the Y and M, and combination of $—CH_2PO_3M_2$ with one or more functional group are same as of the general Formula-I of the first embodiment.

Accordingly, in third embodiment, the present invention relates to a novel composition comprising a N-oxide salt of the functionalized methylene phosphonate of amino-terminated oxyalkylate of the first embodiment and has a general Formula-II:

Formula-II

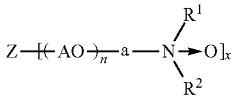

wherein Z, n, A, a, x, $R^1$ and $R^2$, and functional group and the Y and M, and combination of $—CH_2PO_3M_2$ with one or more functional group are same as of the general Formula-I of the first embodiment.

Accordingly, in fourth embodiment, the present invention relates to a novel composition comprising water-soluble N-oxide salt of the functionalized methylene phosphonate of amino-terminated oxyalkylate of the third embodiment having a general Formula-II:

Formula-II

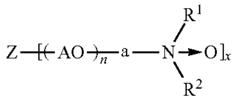

wherein Z, n, A, a, x, $R^1$ and $R^2$, and functional group and the Y and M, and combination of $—CH_2PO_3M_2$ with one or more functional group are same as of the general Formula-II of the third embodiment.

Accordingly, in fifth embodiment, the present invention relates to a method of use of the composition comprising functionalized methylene phosphonate of amino-terminated oxyalkylate, or a corresponding water-soluble salt thereof, or a N-oxide salt thereof, or a water-soluble N-oxide salt thereof as a scale inhibitor in oilfield application for eliminating or at least reducing formation of scales formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly the formation of scales due to deposition of calcium carbonate, calcium sulfate, barium sulfate, strontium sulfate, magnesium sulfate, or a mixture thereof.

Accordingly, in sixth embodiment, the present invention relates to a method of use of the composition comprising functionalized methylene phosphonate of amino-terminated oxyalkylate, or a corresponding water-soluble salt thereof, or a N-oxide salt thereof, or a water-soluble N-oxide salt thereof as a threshold scale inhibitor, chelation agent or sequestration agent in oilfield application.

Accordingly, in seventh embodiment, the present invention relates to a method of use of the composition comprising functionalized methylene phosphonate of amino-terminated oxyalkylate, or a corresponding water-soluble salt thereof, or a N-oxide salt thereof, or a water-soluble N-oxide salt thereof as a dispersant in industrial cooling water, boiler water, oil well process water and other process waters.

Accordingly, in eighth embodiment, the present invention relates to a method of eliminating or at least reducing formation of scales.

As used herein, the term "$—CH_2PO_3M_2$" is meant to include both methylene phosphonic acid and methylene phosphonate.

As used herein "water-soluble salt" refers to the salt resulting from the reaction by neutralizing the acid group with a base or salt and resulting salt remains soluble in water system.

Further objects, embodiments and advantages of the present invention would be more apparent from the following description of the invention.

DETAILED DESCRIPTION AND EMBODIMENTS OF THE INVENTION

Accordingly, in first embodiment, the present invention relates to a novel composition comprising functionalized methylene phosphonate of amino-terminated oxyalkylate, wherein the functionalized methylene phosphonate of amino-terminated oxyalkylate has a general Formula-I:

Formula-I

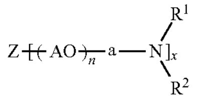

wherein:

Z is selected from hydrogen atom, etheric oxygen atom, hydroxyl, alkyl, aryl, cycloalkyl, heretocyclyl, hydrocarbylene, heterocarbylene, or an organoheteryl having from 1 to 6 carbons;

n is an integer or fractional integer;

A is a lower alkylene group;

a is a lower alkylene group;

x is integer having a value from 1 to 4;

$R^1$ and $R^2$ are independently selected from hydrogen, $—CH_2PO_3M_2$, and a functional group;

wherein n defines the number of oxyalkylene units in the functionalized methylene phosphonate of amino-terminated oxyalkylate;

wherein A is selected from methylene, ethylene, propylene, butylene, methyl ethylene, or a combination thereof;

wherein a is selected from methylene, ethylene, propylene, butylene, methyl ethylene, or ethyl ethylene;

Characterized in that the functional group is selected from $—YCOM$, $—YCO_2M$, $—YSO_3M$, $—YSO_2M$, $—YCONM_2$, $—YCN$, $—YNO_2$, or a combination thereof;

wherein Y is independently selected from an hydrocarbylene, arylene or heterocarbylene selected from methylene, ethylene, propylene, propenyl, 2-methyl-propylene, butylene or 2-hydroxy-propyl, 2-methyl-2-(propionamido)propane, phenylene;

wherein M is independently selected from hydrogen, an alkali metal, alkaline earth metal, ammonium salt, ammonium derivative or lower alkyl group, or a combination thereof;

wherein the functionalized methylene phosphonate of amino-terminated oxyalkylate has at least combination of $—CH_2PO_3M_2$ with one or more functional group.

In accordance with the first embodiment (and the subsequent embodiments) of the present invention, the $R^1$ and $R^2$ in the functionalized methylene phosphonate of amino-terminated oxyalkylate comprising, based on the total mol percent (of the $R^1$ and the $R^2$) are:

a) from 15 mol % to 80 mol %, preferably from 40 mol % to 75 mol %, and more preferably from 50 to 75 mol % of $—CH_2PO_3M_2$ based on the total mol percent (mol %) of the $R^1$ and the $R^2$;

b) from 15 mol % to 50 mol %, preferably from 20 mol % to 50 mol %, and more preferably from 25 to 50 mol % of a functional group based on the total mol percent (mol %) of the $R^1$ and the $R^2$;

wherein the functional group is selected from $—YCOM$, $—YCO_2M$, $—YSO_3M$, $—YSO_2M$, $—YCONM_2$, $—YCN$, $—YNO_2$, or a combination thereof.

In accordance with one of the preferred embodiments of the present invention, the functional group is selected from $—YCO_2M$, $—YSO_3M$, $—YCONM_2$, $—YCN$, or a combination thereof.

In accordance with one of the more preferred embodiments of the present invention, the functional group is selected from $—YCO_2M$, $—YSO_3M$, or a combination thereof.

It may be noted that the term "is" as used herein to define the ingredients or components of the presently provided compositions may be replaced by "consists of" or "consisting" as applicable.

It may be noted that according to the first embodiment (and subsequent embodiments) of the present invention, the $—CH_2PO_3M_2$, and the functional group of the $R^1$ and the $R^2$, which are the preferred embodiments of the presently provide composition, have been defined as above, and the remaining is the hydrogen (of the $R^1$ and the $R^2$).

In accordance with one of the embodiments of the first embodiment (and the subsequent embodiments), the n is an integer or fractional integer which, or on average varies from about 0.25 to about 75.

In accordance with one of the embodiments of the first embodiment (and the subsequent embodiments), the n defines the number of oxyalkylene units in the functionalized methylene phosphonate of amino-terminated oxyalkylate and preferably varies from about 0.25 to about 6.

Accordingly, in second embodiment, the present invention relates to a novel composition comprising water-soluble salt of the functionalized methylene phosphonate of amino-terminated oxyalkylate of the general Formula-I of the first embodiment:

Formula-I

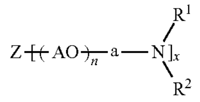

wherein Z, n, A, a, x, $R^1$ and $R^2$, and functional group and the Y and M, and combination of $—CH_2PO_3M_2$ with one or more functional group are same as of the general Formula-I of the first embodiment.

In accordance with one of the embodiments of the present invention, the water-soluble salt may be prepared by neutralizing acid groups of $—CH_2PO_3M_2$ and functional group with a stoichiometric amount of a base salt.

As per one of the embodiments of the present invention, the base salt comprises alkali metal, alkaline earth metal, ammonium, or ammonium derivative.

Accordingly, in third embodiment, the present invention relates to a novel composition comprising a N-oxide salt of the functionalized methylene phosphonate of amino-terminated oxyalkylate of the first embodiment and has a general Formula-II:

Formula-II

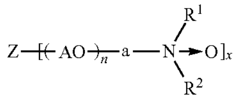

wherein Z, n, A, a, x, $R^1$ and $R^2$, and functional group and the Y and M, and combination of $—CH_2PO_3M_2$ with one or more functional group are same as of the general Formula-I of the first embodiment.

Accordingly, in fourth embodiment, the present invention relates to a novel composition comprising a water-soluble N-oxide salt of the functionalized methylene phosphonate of amino-terminated oxyalkylate of the third embodiment having a general Formula-II:

Formula-II

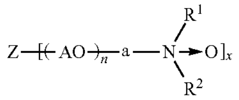

wherein Z, n, A, a, x, $R^1$ and $R^2$, and functional group and the Y and M, and combination of $—CH_2PO_3M_2$ with one or more functional group are same as of the general Formula-I of the first embodiment;

wherein the water-soluble N-oxide salt may be one as obtained by neutralizing the $—CH_2PO_3M_2$ and the functional group with a stoichiometric amount of base salt.

As per one of the embodiments of the present invention, the base salt comprises alkali metal, alkaline earth metal, ammonium, or ammonium derivative.

Accordingly, in fifth embodiment, the present invention relates to a method for eliminating or at least reducing formation of scales, wherein the method comprises a step of adding the composition comprising:

(a) the functionalized methylene phosphonate of amino-terminated oxyalkylate of the present invention;

(b) the water-soluble salt of the functionalized methylene phosphonate of amino-terminated oxyalkylate of the present invention;

(c) the N-oxide salt of the functionalized methylene phosphonate of amino-terminated oxyalkylate of the present invention; or (d) the water-soluble N-oxide salt of the functionalized methylene phosphonate of amino-terminated oxyalkylate of the present invention;

wherein the composition is added to a medium in an amount sufficient to eliminate or to reduce formation of the scales;

wherein the composition is added as a scale inhibitor for eliminating or at least reducing formation of the scales.

In accordance with one of the embodiments of the present invention, the medium, without limitation, includes oilfield.

In accordance with one of the embodiments of the present invention, the medium comprises alkaline earth metal cation comprising calcium, barium, strontium, magnesium, or a mixture thereof along with anion comprising sulfate, carbonate, bicarbonate, phosphate, silicate, sulfide, or a mixture thereof.

In accordance with one of the embodiments of the present invention, the scales are formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof.

In accordance with one of the embodiments of the present invention, the scales are formed due to deposition of calcium carbonate, calcium sulfate, barium sulfate, strontium sulfate, magnesium sulfate, or a mixture thereof.

Accordingly, in sixth embodiment, the present invention relates to a method for using the composition comprising:

(a) the functionalized methylene phosphonate of amino-terminated oxyalkylate of the present invention;

(b) the water-soluble salt of the functionalized methylene phosphonate of amino-terminated oxyalkylate of the present invention;

(c) the N-oxide salt of the functionalized methylene phosphonate of amino-terminated oxyalkylate of the present invention; or (d) the water-soluble N-oxide salt of the functionalized methylene phosphonate of amino-terminated oxyalkylate of the present invention;

as a threshold scale inhibitor, a chelation agent, or a sequestration agent in oilfield application.

Accordingly, in seventh embodiment, the present invention relates to a method for using the composition comprising:

(a) the functionalized methylene phosphonate of amino-terminated oxyalkylate of the present invention;

(b) the water-soluble salt of the functionalized methylene phosphonate of amino-terminated oxyalkylate of the present invention;

(c) the N-oxide salt of the functionalized methylene phosphonate of amino-terminated oxyalkylate of the present invention; or (d) the water-soluble N-oxide salt of the functionalized methylene phosphonate of amino-terminated oxyalkylate of the present invention;

as a dispersant in industrial cooling water, boiler water, oil well process water and other process waters.

Accordingly, in eighth embodiment, the present invention relates to a method of eliminating or at least reducing formation of scales, wherein the method comprises a step of adding the composition comprising functionalized methylene phosphonate of amino-terminated oxyalkylate, or a corresponding water-soluble salt thereof, or a N-oxide salt thereof, or a water-soluble N-oxide salt thereof in a medium containing alkaline earth metal cations comprising (including) calcium, barium, strontium, magnesium, or a mixture thereof along with anions comprising (including) sulfate, carbonate, bicarbonate, phosphate, silicate, sulfide, or a mixture thereof in an amount sufficient to eliminate or to reduce formation of the scales, wherein the scales are (or may be) formed due to deposition of alkaline earth metal cations comprising (including) calcium, barium, strontium, magnesium, or a mixture thereof along with anions comprising (including) sulfate, carbonate, bicarbonate, phosphate, silicate, sulfide, or a mixture thereof, particularly wherein the scales are (or may be) formed due to deposition of calcium carbonate, calcium sulfate, barium sulfate, strontium sulfate, magnesium sulfate, or a mixture thereof.

As per one of the embodiments of the present invention, the compositions of the present invention may also be used in other applications including but not limited to use in sequestration, corrosion inhibition, pharmaceutical, textile treating agents, surfactants, agricultural chemicals, cosmetics, sugar and beer industry, fertilizers, paper pulp bleaching, brightness reversion avoidance, paper and pulp treatment, metal treatment, mining, reverse osmosis membrane treatment, and the like.

PREFERRED EMBODIMENTS OF THE INVENTION

In accordance with one of the preferred embodiments of the present invention, the presently provided composition may comprise one or more of a compound of a structural Formula 3 to 23, wherein the compound is selected from:

a polyamino polyether N,N'-di(methylene phosphonic acid) N,N'-di(ethane 2-amido-2-methylpropane sulfonic acid), having a structural Formula-3 having —$YSO_3H$ as a functionalized group:

Formula-3

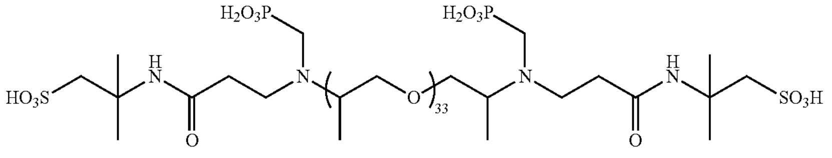

a polyamino polyether N,N'-di(methylene phosphonic acid) N,N'-di(ethane sodium sulfonate), having a structural Formula-4 having —$YSO_3Na$ as a functionalized group:

Formula-4

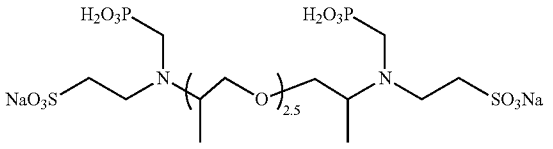

a polyamino polyether N,N'-di(methylene phosphonic acid) N,N'-di(propanoic acid) having a structural Formula-5 having —$YCO_2H$ as a functionalized group:

Formula-5

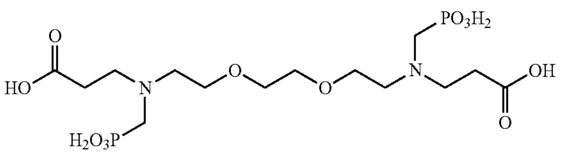

a polyamino polyether N,N,N'-tri(methylene phosphonic acid) N'-ethyl sodium 4-benzene sulfonate having a structural Formula-6 having —$YSO_3Na$ as a functionalized group:

Formula-6

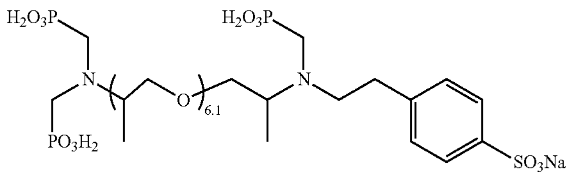

a polyamino polyether N,N,N'-tri(methylene phosphonic acid) N'-ethane sodium sulfonate Formula-7 having —$YSO_3Na$ as a functionalized group:

Formula-7

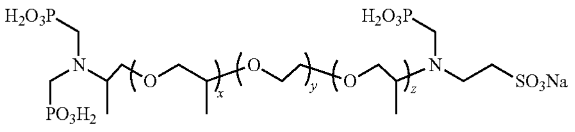

x + z = 3.6
y = 9 a 3-(N-(2-(2-hydroxyethoxy)ethyl)-N-(methylenephosphonic acid)amino)propanoic acid having a structural Formula-8 having —$YCO_2H$ as a functionalized group:

Formula-8

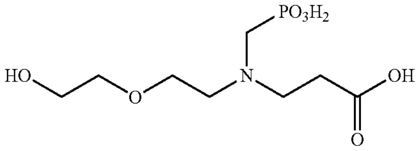

a polyamino polyether N-(methylene phosphonic acid) N-ethane sodium sulfonate having a structural Formula-9 having —$YSO_3Na$ as a functionalized group:

Formula-9

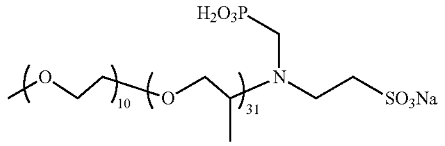

a polyamino polyether (propanoic acid) methylene phosphonic acid having a structural Formula-10 having —$YCO_2H$ as a functionalized group:

Formula-10

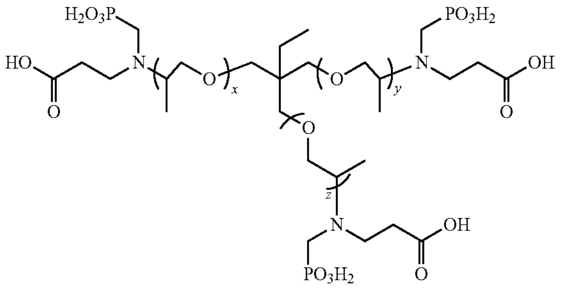

x + y + z = 6 a polyamino polyether N,N',N"-tri(methylene phosphonic acid) N-ethane sodium sulfonate N',N"-di(propanoic acid) having a structural Formula-11 having —$YCO_2H$ and —$YSO_3Na$ as functionalized groups:

Formula-11

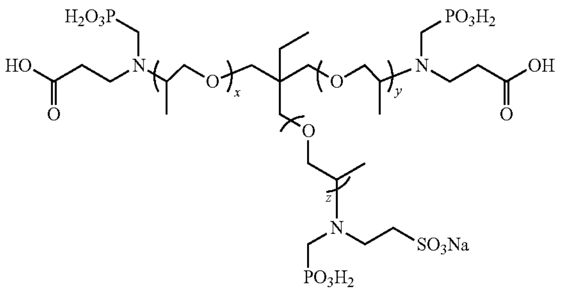

x + y + z = 6 a polyamino polyether N,N'-di(methylene phosphonic acid) N,N'-di(ethane sodium sulfonate) N-oxide salt (derivative) having a structural Formula-12 having —$YCO_2H$ and —$YSO_3Na$ as functionalized groups:

Formula-12

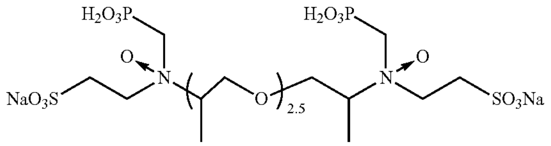

a polyamino polyether N,N'-di(methylene phosphonic acid) N,N'-di(propanoic acid) N-oxide salt (derivative) having a structural Formula-13 having —$YCO_2H$ as a functionalized group:

Formula-13

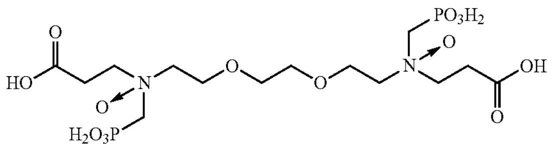

a polyamino polyether N,N,N'-tri(methylene phosphonic acid) N'-propane-1-sulfonic acid having a structural Formula-14 having —$YSO_3H$ as a functionalized group:

Formula-14

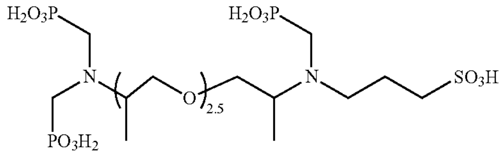

a polyamino polyether N,N,N'-tri(methylene phosphonic acid) N'-propanoic acid having a structural Formula-15 having —$YCO_2H$ as a functionalized group:

Formula-15

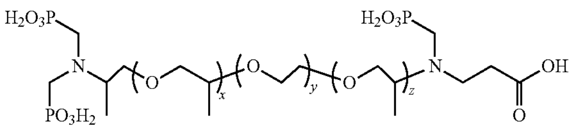

x + z = 1.2
y = 2 a polyamino polyether N,N,N'-tri(methylene phosphonic acid) N'-propanoic acid having a structural Formula-16 having —$YCO_2H$ as a functionalized group:

Formula-16

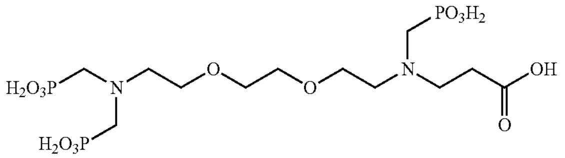

a polyamino polyether N,N,N'-tri(methylene phosphonic acid) N'-ethane 2-amido-2-methylpropane sulfonic acid having a structural Formula-17 having —$YSO_3H$ as a functionalized group:

Formula-17

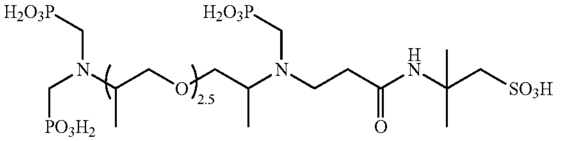

a polyamino polyether N,N,N'-tri(methylene phosphonic acid) N'-ethane sodium sulfonate having a structural Formula-18 having —$YSO_3Na$ as a functionalized group:

Formula-18

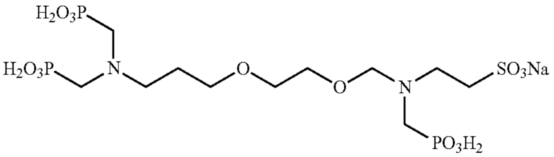

a polyamino polyether N,N,N'-tri(methylene phosphonic acid) N'-ethane sodium sulfonate having a structural Formula-19 having —$YSO_3Na$ as a functionalized group:

Formula-19

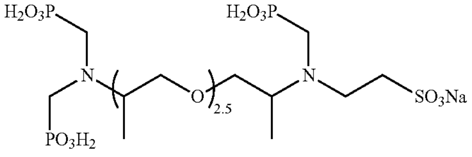

a polyamino polyether N,N,N'-tri(methylene phosphonic acid) N'-ethane 2-amido-2-methylpropane sulfonic acid having a structural Formula-20 having —$YSO_3H$ as a functionalized group:

Formula-20

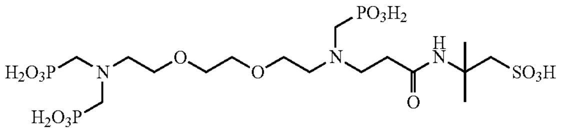

a polyamino polyether N,N,N'-tri(methylene phosphonic acid) N'-propanoic acid having a structural Formula-21 having —$YCO_2H$ as a functionalized group:

Formula-21

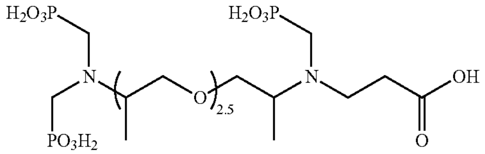

a polyamino polyether N,N,N'-tri(methylene phosphonic acid) N'-propane-1-sulfonic acid having a structural Formula-22 having —$YSO_3H$ as a functionalized group:

Formula-22

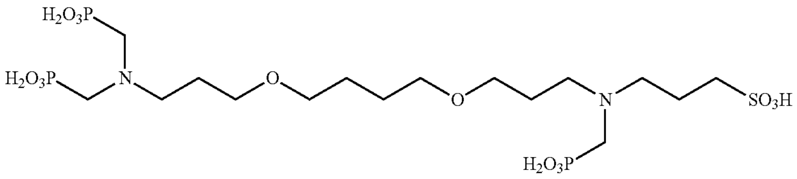

a polyamino polyether N,N,N'-tri(methylene phosphonic acid) N'-propane-1-sulfonic acid having a structural Formula-23 having —$YSO_3H$ as a functionalized group:

Formula-23

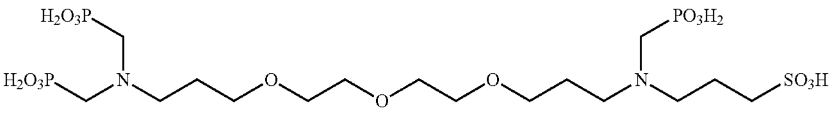

In accordance with one of the embodiments of the present invention, the presently provided composition may comprise a combination of one of more of the functionalized scale inhibitors of the structural Formulae 3 to 23.

Accordingly, in one of the preferred embodiments, the composition comprising functionalized methylene phosphonate of amino-terminated oxyalkylate, or a corresponding water-soluble salt, or a N-oxide salt thereof, or a water-soluble N-oxide salt thereof, or a method of use thereof is used for eliminating or at least reducing formation of scales formed due to deposition of alkaline earth metal cations along with anions, particularly the formation of scales due to deposition of calcium carbonate, calcium sulfate, barium sulfate, strontium sulfate, magnesium sulfate, or a mixture thereof not only at a wide range of temperature and pressure, but also in low, medium and high salinity media and also under low, medium and high brine environments;

- wherein the functionalized methylene phosphonate of amino-terminated oxyalkylate or a corresponding water-soluble salt thereof is characterized by a general Formula-I as defined herein above;
- wherein the N-oxide salt or a water-soluble N-oxide salt of the functionalized methylene phosphonate of amino-terminated oxyalkylate is characterized by a general Formula-II as defined herein above.

Accordingly, in another preferred embodiment, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof is used as a threshold scale inhibitor, chelation agent or sequestration agent in oilfield application;

- wherein the functionalized methylene phosphonate of amino-terminated oxyalkylate or a corresponding water-soluble salt thereof is characterized by a general Formula-I as defined herein above;
- wherein the N-oxide salt or the water-soluble N-oxide salt of the functionalized methylene phosphonate of amino-terminated oxyalkylate is characterized by a general Formula-II as defined herein above.

Accordingly, in still another preferred embodiment, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof is used as a dispersant in industrial cooling water, boiler water, oil well process water and other process waters;

- wherein the functionalized methylene phosphonate of amino-terminated oxyalkylate or a corresponding water-soluble salt thereof is characterized by a general Formula-I as defined herein above;
- wherein the N-oxide salt or a water-soluble N-oxide salt of the functionalized methylene phosphonate of amino-terminated oxyalkylate is characterized by a general Formula-II as defined herein above.

Temperature at which the Present Compositions May be Used:

Accordingly, as per one of the preferred embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is capable of preventing formation of scales due to deposition of alkaline earth metal cations along with anions, particularly the formation of scales due to deposition of calcium carbonate, calcium sulfate, barium sulfate, strontium sulfate, magnesium sulfate, or a mixture thereof at a temperature range varying from about 10° C. to about 200° C.

Pressure at which the Present Compositions May be Used:

Accordingly, as per one of the preferred embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is capable of preventing formation of scales due to deposition of alkaline earth metal cations along with anions, particularly the formation of scales due to deposition of calcium carbonate, calcium sulfate, barium sulfate, strontium sulfate, magnesium sulfate, or a mixture thereof at a pressure range varying from about 1 atm to about 200 atm.

Medium Wherein the Present Compositions May be Used:

Accordingly, as per one of the preferred embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is capable of preventing formation of scales due to deposition of alkaline earth metal cations along with anions, particularly the formation of scales due to deposition of calcium carbonate, calcium sulfate, barium sulfate, strontium sulfate, magnesium sulfate, or a mixture thereof in an aqueous system having high salinity, particularly in a low, medium and high brine environment with a total salinity varying from about 35000 ppm to about 400000 ppm.

Aqueous System Wherein the Present Compositions May be Used:

In accordance with one of the embodiments of the present invention, the aqueous system may comprise industrial cooling water, boiler water, oil well process water or other process water, which particularly is used in the oilfield application.

Calcium Concentration of the System Wherein the Present Compositions May be Used:

In accordance with one of the embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is suitable for the system, wherein the calcium concentration may vary from about 100 ppm to about 50000 ppm, preferably from about 100 ppm to about 30000 ppm.

Barium Concentration of the System Wherein the Present Compositions May be Used:

In accordance with one of the embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is suitable for the system, wherein the barium concentration may vary from about 1 ppm to about 25000 ppm, preferably from about 1 ppm to about 10000 ppm.

Strontium Concentration of the System Wherein the Present Compositions May be Used:

In accordance with one of the embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is suitable for the system, wherein the strontium concentration may vary between about 50 ppm to about 25000 ppm, preferably from about 1 ppm to about 10000 ppm.

Magnesium Concentration of the System Wherein the Present Compositions May be Used:

In accordance with one of the embodiments of the present invention, the composition comprising functionalized methylene phosphonate of amino-terminated oxyalkylate, or a corresponding water-soluble salt thereof, or a N-oxide salt thereof, or a water-soluble N-oxide salt thereof, or a method of use thereof as a scale inhibitor is suitable for the system, wherein the magnesium concentration may vary between about 1 ppm to about 25000 ppm, preferably from about 1 ppm to about 10000 ppm.

Amount of the Composition to be Added to a Medium or System:

In accordance with one of the embodiments of the present invention, the method of use comprises a step of using the composition comprising functionalized methylene phosphonate of amino-terminated oxyalkylate, or a corresponding water-soluble salt thereof, or a N-oxide salt thereof, or a water-soluble N-oxide salt thereof of the present invention as a scale inhibitor, wherein the composition may be added to a medium or a system in a concentration varying from about 0.1 ppm to about 500 ppm.

Additional Uses of the Present Compositions as Chelating Agent, or as Sequestering Agent, or as Threshold Inhibiting Agent:

In accordance with one of the embodiments of the present invention, the method of use comprises a step of using the composition comprising functionalized methylene phosphonate of amino-terminated oxyalkylate, or a corresponding water-soluble salt thereof, or a N-oxide salt thereof, or a water-soluble N-oxide salt thereof of the present invention as a chelating agent or as a sequestering agent, wherein the composition may be added to the medium or a system in a concentration varying from about 500 ppm to about 10000 ppm when used as chelating agent, or as sequestering agent.

In accordance with one of the embodiments of the present invention, the method of use comprises a step of using the composition comprising functionalized methylene phosphonate of amino-terminated oxyalkylate, or a corresponding water-soluble salt thereof, or a N-oxide salt thereof, or a water-soluble N-oxide salt thereof of the present invention as a threshold inhibiting agent, wherein the composition may be added in an amount varying from about 0.1 to about 5000 ppm, preferably from about 0.1 to about 500 ppm to a medium or a system.

In accordance with one of the embodiments of the present invention, the system may be an aqueous system, oil-well system, pipeline system, or a multi-phase system.

In accordance with one of the embodiments of the present invention, the composition of the present invention may be also used as a chelating agent or as a sequestering agent in an environment having a temperature varying from about 10° C. to about 200° C.

In accordance with one of the embodiments of the present invention, the composition of the present invention may also be used as a chelating agent or as a sequestering agent in an environment having a pressure varying from about 1 atm to about 200 atm.

In accordance with one of the embodiments of the present invention, the present composition may be used in a diluted formulation with water or an alcoholic solvent.

In accordance with one of the embodiments of the present invention, the alcoholic solvent is selected from the group comprising: methanol, ethanol, isopropanol, butanol, ethylene glycol, di ethylene glycol, tri ethylene glycol, or propylene glycol.

Methods of Preparation of the Present Compositions:

It may be noted that the scope of the present invention is not limited by way of a method of preparation thereof.

However, as an exemplary embodiment, the compositions of the present invention may be prepared from commercially available polyetheramines. The polyetheramines may comprise monoamines, diamines, triamines, or a mixture thereof based on the oxyalkylate's backbone.

As another exemplary embodiment, other commercial oxyalkylates amines that may be used to prepare the compositions of the present invention may be selected from the group comprising 2-(2-aminoethoxy)ethanol, 2-methoxyethylamine, morpholine 3-methoxypropylamine, 4,7,10-trioxa-tridecane-1,13-diamine, 4,9-dioxado-decane-1,12-diamine, ethylene glycol bis(2-aminoethyl) ether, 1,7-diaza-12-crown-4 or 1,4,10,13-tetraoxa-7,16-diazacyclooctadecane, etc.

As another exemplary embodiment, the compositions of the present invention may be prepared by reacting the polyetheramines by Michael addition method of acrylate esters, methacrylate esters, acrylic acid, methacrylic acid, 2-acrylamido-2-methylpropane sulfonic acid, vinyl sulfonic acid and salts, acrylamide or acrylonitrile as the first step of reaction, as illustrated in the following reaction scheme-1:

Reaction Scheme - 1

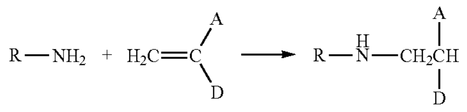

- wherein R is selected from the group comprising ethylene oxide, propylene oxide, or mixed backbone having from 1 to 75 units of oxyalkylene units with an integer or fractional integer;
- wherein A is selected from the group comprising hydrogen or methyl;
- wherein D is selected from the group comprising aldehyde group, ketone group, ester group, carboxylic acid group, sulfonic acid group and salts, sulfone group, amide group, nitrile group, nitro group, or a mixed group thereof, preferably the carboxylic acid group, or the sulfonic acid group.

As another exemplary embodiment, as an alternate to the above first stage of the reaction or in addition to above Michael addition method, the polyetheramine may be reacted as illustrated in the following reaction scheme-2:

Reaction Scheme - 2

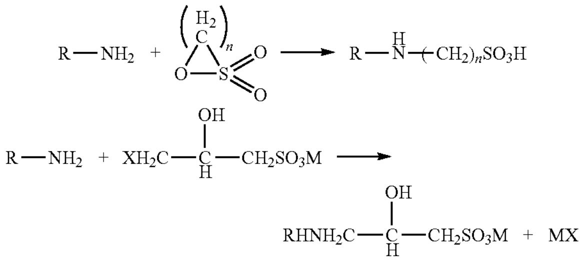

wherein R is selected from the group comprising ethylene oxide, propylene oxide, or mixed backbone having from 1 to 75 units of oxyalkylene units with an integer or fractional integer;

wherein n is an integer, from about 1 to about 6 and it defines the number of alkylene units in the molecule and may preferably vary from about 3 to about 4;

wherein X is selected from the group comprising halogen atoms, and may preferably be chlorine;

wherein M is selected from the group comprising hydrogen or an alkali metal, such as sodium, potassium.

Still an another exemplary embodiment, in one of the exemplary embodiments, all of the remaining nitrogen-bonded hydrogens may be converted to the methylene phosphonic acid of the present invention by phospha-Mannich method to second step of the reaction by a conventionally known method, wherein the product of the first step is added to a mixture of phosphorous acid, preferably, in the presence of a strong mineral acid such as hydrochloric acid in a continuously stirred tank reactor, and then the formaldehyde is added into reaction mixture under heating condition, preferably at a temperature varying from about 80° C. to about 120° C., preferably under refluxing condition. Reaction time depends on reaction variables, the preferred reaction time may vary from about 1 hour to about 12 hours, and the more preferred reaction time may vary from about 2 hours to 7 hours, and such a reaction scheme-3 may be illustrated by the following reaction:

Reaction Scheme - 3

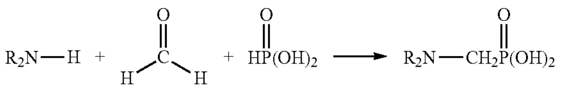

wherein $R_2NH$ is the first step reaction product, a functionalized polyetheramine.

In accordance with one of the exemplary embodiment, the compositions comprising functionalized methylene phosphonate of amino-terminated oxyalkylate of the present invention may be converted into the corresponding alkali metal, alkaline earth metal or ammonium salts. Preferably, the compositions of the present invention may be converted into sodium, potassium, magnesium, calcium, ammonium, mono, di-, tri-ethanolamine, morpholine, methoxypropylamine, methoxyethylamine, ethylenediamine, diethylenetriamine, triethylenetetramine, tetraethylenepentamine, methylamine, ethylamine, diethylamine, trimethylamine and polyetheramines salts.

Optionally, the compositions of the reaction scheme 4 may be converted into a N-oxide salt or a water-soluble N-oxide salt by an oxidation step, wherein $R_2N—CH_2P(=O)(OH)_2$ is converted to $R_2N(\rightarrow O)—CH_2P(=O)(OH)_2$ [Reaction Scheme-4]

wherein $R_2N—CH_2P(=O)(OH)_2$ is the second step reaction product, a functionalized methylene phosphonates of amino-terminated oxyalkylates.

It may be noted that the N-oxide salt may also be referred to as N-oxide derivative.

In accordance with one of the exemplary embodiments, the composition comprising functionalized methylene phosphonate of amino-terminated oxyalkylate, or a corresponding water-soluble salt thereof, or a N-oxide salt (derivative) thereof, or a water-soluble N-oxide salt thereof can be used together with one or more conventional scale inhibitors comprising polymeric scale inhibitor, or phosphonate, for controlling the formation, deposition and adherence of mineral scales.

In accordance with one of the exemplary embodiments, the polymeric scale inhibitor has average molecular weight of 500 g/mol or greater, and it may be prepared by polymerization of one or more monomers selected from the group consisting of acrylamide and its derivatives, acrylic acid and its esters and salts, 2-carboxyethyl acrylate and its esters and salts, methacrylic acid and its esters and salts, maleic acid and its esters and salts, fumaric acid and its esters and salts, itaconic acid and its esters and salts, 2-acrylamido-2-methylpropane sulfonic acid and its salts, 3-sulfopropyl acrylate and its esters and salts, 4-styrene sulfonic acid and its salts, allyl sulfonic acid and its salts, 3-allyloxy-2-hydroxypropane sulfonic acid ant its salts, methallyl sulfonic acid and its salts, vinyl sulfonic acid and its salts, 1-vinyl-2 pyrrolidone, 4-acryloylmorpholine, hydroxy alkyl acrylates and methacrylates, 3-allyloxy-1,2-propanediol, dialkylaminoalkyl acrylates and methacrylates and their quaternary derivatives, dialkylaminoalkyl acrylamides and methacrylamides and their quaternary derivatives, hydroxy alkyl methacrylate phosphate acid and its esters and salts, vinyl phosphonic acid and its esters and salts;

In accordance with one of the exemplary embodiments, the phosphonate is selected from the group consisting of HEDP (hydroxyethylidene diphosphonic acid), ATMP (amino tris-methylene phosphonic acid), DTPMP (diethylene triamine pentakis-methylphosphonic acid), BHMPMP (bis-hexamethylene pentakis-methylphosphonic acid), HEMPA (hydroxyethylamino di-methylene phosphonic acid), PBTC (2-phosphonobutane 1,2,4-tricarboxylic acid), PAPEMP (polyamino polyether methylene phosphonic acid) and DGA (diglycolamine) phosphonate.

In operation, for example in the oilfield application, the composition of the present invention may be used to inhibit the formation, deposition and adherence of alkaline earth metal scale deposits, wherein the scale deposits may comprise calcium carbonate ($CaCO_3$), calcium sulfate ($CaSO_4$), strontium sulfate ($SrSO_4$), or barium sulfate ($BaSO_4$) magnesium sulfate ($MgSO_4$) in the aqueous systems.

There are different testing methodologies utilized to determine the effectiveness of the scale inhibitor, such as stirred bottle test and dynamic scale loop test (DSL) to measure the effectiveness of the scale inhibitor under dynamic conditions.

In contrast to the conventional scale inhibitors as known in the prior art, the compositions of the present invention have been found to be effective to maintain improved inhibitive activity in low, medium and high brines, such as many fields found in the Pre-Salt, with a total salinity varying from about 35000 to about 400000 ppm, and even in high temperature of about 80° C. or greater, and even under a pressure of about one atmosphere (atm) and greater, wherein the calcium concentration may vary from about 1000 to about 50000 ppm, the barium concentration may vary from about 1 to about 1000 ppm or the strontium concentration may vary from about 50 to about 5000 ppm, and wherein brine may comprise one or more of the calcium, barium, and strontium.

As mentioned above, the fields found in Pre-Salt can be Brazilian basins in the offshore Pre-Salt exploration, but are not to limited to Pre-Salt condition.

It may be noted that the scope of the present invention may not be limited to low, medium and high brines having a total salinity varying from about 35000 to about 400000 ppm, because the present compositions may also be used in the brines having medium salinity varying from about 10000 ppm to 35000 ppm, and the present compositions may also be used in the brines having low salinity varying from about 100 ppm to 10000 ppm.

It may be noted that the scope of the present invention may not be limited to a particular water treatment system. The present compositions may also be used in the water treatment system selected from the group comprising a cooling water system, a boiler water system, an industrial water system, and the like.

The compositions of the present invention have been, surprisingly and unexpectedly, found to have substantially improved bivalent ions tolerance, wherein the bivalent ions may be selected from a group comprising: calcium (Ca), strontium (Sr), barium (Ba), magnesium (Mg), or a mixture thereof, hence the compositions of the present invention have been, surprisingly and unexpectedly, found to have capability of demonstrating substantially improved bivalent ions tolerance, preferably substantially improved calcium (Ca) tolerance, strontium (Sr) tolerance, barium (Ba) tolerance, magnesium (Mg) tolerance in an aqueous solution. The bivalent ions tolerance including the strontium tolerance, the calcium tolerance, the barium tolerance, the magnesium tolerance is a measure of ability of the scale inhibitor to remain soluble, instead of forming insoluble precipitate in the presence of the bivalent ions including the strontium ions, the calcium ions, or the barium ions. As an exemplary embodiment, the calcium tolerance, the strontium tolerance, the barium tolerance, the magnesium tolerance of the scale inhibitors may be checked at a wide range of concentrations with the field's produced water.

Therefore, the presently provided compositions comprising the functionalized methylene phosphonate of amino-terminated oxyalkylate or the corresponding water-soluble salt thereof, or the N-oxide salt (derivative) thereof, or the water-soluble N-oxide salt thereof have been, surprisingly and unexpectedly, found to be versatile and useful under the severe conditions of water treatment applications.

Therefore, the presently provided compositions comprising the functionalized methylene phosphonate of amino-terminated oxyalkylate, or the corresponding water-soluble salt thereof, or the N-oxide salt (derivative) thereof, or the water-soluble N-oxide salt thereof have also been, surprisingly and unexpectedly, found to be useful as effective threshold scale inhibitors, corrosion inhibitors, chelation agent or sequestration agent of metal ions and dispersants in industrial cooling water, boiler water, oilfield water and other process waters.

EXAMPLES

The following examples are presented to illustrate the present invention, but are not intended to limit the scope of the present invention.

TABLE 1

Examples of the compositions of the present invention.

| Example | Formula | Z | n | A | a | x | $R^1$ and $R^2$ (mol %) | Y | M |
|---|---|---|---|---|---|---|---|---|---|
| 1 | I | methyl ethylene | 15.5 | methyl ethylene | methyl ethylene | 2 | —$YSO_3M$ (50%)<br>—$CH_2PO_3M_2$ (50%) | 2-methyl-2-(propionamido) propane | hydrogen |
| 2 | I | methyl ethylene | 0.25 | methyl ethylene | methyl ethylene | 2 | —$YSO_3M$ (50%)<br>—$CH_2PO_3M_2$ (50%) | ethylene | hydrogen and sodium |
| 3 | I | ethylene | 0.50 | methylene | methylene | 2 | —$YCO_2M$ (50%)<br>—$CH_2PO_3M_2$ (50%) | ethylene | hydrogen |
| 4 | I | methyl ethylene | 2.05 | methyl ethylene | methyl ethylene | 2 | —$YSO_3M$ (25%)<br>—$CH_2PO_3M_2$ (75%) | phenylene | hydrogen and sodium |
| 5 | I | ethylene | 5.3 | ethylene and methyl ethylene | methyl ethylene | 2 | —$YSO_3M$ (25%)<br>—$CH_2PO_3M_2$ (75%) | ethylene | hydrogen and sodium |
| 6 | I | hydroxyl | 1.0 | ethylene | ethylene | 1 | —$YCO_2M$ (40%)<br>—$CH_2PO_3M_2$ (60%) | ethylene | hydrogen |
| 7 | I | methyl | 40.0 | ethylene and methyl ethylene | methyl ethylene | 1 | —$YSO_3M$ (50%)<br>—$CH_2PO_3M_2$ (50%) | ethylene | hydrogen and sodium |
| 8 | I | polyhydric ether alcohols (6 carbon) | 1.0 | methyl ethylene | methyl ethylene | 3 | —$YCO_2M$ (50%)<br>—$CH_2PO_3M_2$ (50%) | ethylene | hydrogen |
| 9 | I | polyhydric ether alcohols (6 carbon) | 1.0 | methyl ethylene | methyl ethylene | 3 | —$YSO_3M$ (17%)<br>—$YCO_2M$ (33%)<br>—$CH_2PO_3M_2$ (50%) | ethylene | hydrogen and sodium |
| 10 | II | methyl ethylene | 0.25 | methyl ethylene | methyl ethylene | 2 | —$YSO_3M$ (50%)<br>—$CH_2PO_3M_2$ (50%) | ethylene | hydrogen and sodium |
| 11 | II | ethylene | 0.50 | methylene | methylene | 2 | —$YCO_2M$ (50%)<br>—$CH_2PO_3M_2$ (50%) | ethylene | hydrogen |
| 12 | I | etheric oxygen atom | 1.0 | ethylene | propylene | 2 | —$YCO_2M$ (25%)<br>—$CH_2PO_3M_2$ (75%) | ethylene | hydrogen |
| 13 | I | ethylene | 5.3 | ethylene and methyl ethylene | methyl ethylene | 2 | —$YSO_3M$ (25%)<br>—$CH_2PO_3M_2$ (75%) | propylene | hydrogen |
| 14 | I | methyl ethylene | 0.25 | methyl ethylene | methyl ethylene | 2 | —$YSO_3M$ (25%)<br>—$CH_2PO_3M_2$ (75%) | propylene | hydrogen |

TABLE 1-continued

Examples of the compositions of the present invention.

| Example | Formula | Z | n | A | a | x | $R^1$ and $R^2$ (mol %) | Y | M |
|---|---|---|---|---|---|---|---|---|---|
| 15 | I | methyl ethylene | 0.25 | methyl ethylene | methyl ethylene | 2 | —$YCO_2M$ (25%) —$CH_2PO_3M_2$ (75%) | ethylene | hydrogen |
| 16 | I | 1,4-cyclohexylene | 1.0 | methylene | methyl ethylene | 2 | —$YSO_3M$ (25%) —$CH_2PO_3M_2$ (75%) | butylene | hydrogen |
| 17 | I | methyl ethylene | 0.25 | methyl ethylene | methyl ethylene | 2 | —$YCONM_2$ (25%) —$CH_2PO_3M_2$ (75%) | ethylene | hydrogen |
| 18 | I | methyl ethylene | 0.25 | methyl ethylene | methyl ethylene | 2 | —YCN (25%) —$CH_2PO_3M_2$ (75%) | ethylene | hydrogen |

In the above Table-1 specific examples have been carried out with the compositions either based on the general Formula-I (functionalized PAPEMP) or based on the general Formula-II (N-oxide salt (derivative) of the functionalized PAPEMP), according to the embodiments described herein above. For each example shown in the above Table-1, the Z, n, A, a, x, $R^1$ and $R^2$, and Y and M have been specifically described.

In order to explore the scale inhibiting efficiency of the compositions of the present invention, an exemplary brine was developed based on Pre-Salt condition. The exemplary composition of the brine is given in Table-2 wherein calcium concentration is about 7200 ppm, barium concentration is about 40 ppm, and strontium concentration is about 950 ppm. Sodium hydroxide or hydrochloric acid was used to give the desired pH or about 6 to about 7. The brine was formed by mixing an anionic solution comprising sodium chloride, anhydrous sodium sulfate, sodium acetate, sodium bicarbonate and sodium bromide with a cationic solution comprising sodium chloride, magnesium chloride hexahydrate, dihydrous calcium chloride, dihydrous strontium chloride, dihydrous barium chloride, and potassium chloride.

TABLE 2

Pre-salt brine composition used for scale inhibition test.

| Salt | Amount (per liter total concentrate) |
|---|---|
| $MgCl_2•6H_2O$ | 11.84 g |
| $CaCl_2•2H_2O$ | 26.34 g |
| $SrCl_2•6H_2O$ | 2.88 g |
| $BaCl_2•2H_2O$ | 0.07 g |
| KCl | 5.72 g |
| $Na_2SO_4$ | 0.80 g |
| $NaHCO_3$ | 1.55 g |
| $CH_3CO_2Na$ | 0.53 g |
| NaBr | 133.29 g |
| NaCl | 11.84 g |

Brine Compatibility Test

As an exemplary embodiment, the calcium tolerance may be evaluated as per the brine compatibility test known in the art. In this test 50-50 mixture of the cationic and anionic solutions without scale forming anions are employed. Scale inhibitor is added at wide range of concentrations in the synthetic brine. Then, the samples are placed in a water bath and heated at about 90° C. After about 24 hours, the visual observations of the scale inhibitors are checked. The results are shown in Table 2.

In the following Table-3, the entry "H" indicates that high precipitation occurs, entry "L" indicates that low precipitation or turbidity occurs, and entry "C" indicates that brine remains clear, without any precipitate or turbidity.

All the examples and comparative products were added using 20.8% in (by) weight based on active acid in concentration of the Scale Inhibitor.

TABLE 3

Compatibility measurement of different compositions at a temperature of about 90° C. after a duration of time of about 24 hours. Compatibility test in Synthetic Brine

| Compound** | Salt | Concentration of the Scale Inhibitor (ppm) | Visual aspect |
|---|---|---|---|
| Example 1 | Acid | 5000 | C |
| Example 2 | Acid | 5000 | C |
| Example 3 | Acid | 5000 | C |
| Example 4 | Acid | 5000 | C |
| Example 5 | Acid | 5000 | C |
| Example 6 | Acid | 5000 | C |
| Example 8 | Acid | 5000 | C |
| Example 9 | Acid | 5000 | C |
| Example 10 | Sodium | 5000 | L |
| Example 11 | Acid | 5000 | C |
| Conventional PAPEMP | Acid | 1000 | L |
| Conventional PAPEMP | Ethylenediamine | 1000 | H |
| Conventional PAPEMP | Ethylenediamine | 2500 | H |
| Conventional PAPEMP | Ethylenediamine | 5000 | H |
| Conventional amino phosphonic-sulfonic acid | Ethylenediamine | 1000 | L |
| Conventional amino phosphonic-sulfonic acid | Ethylenediamine | 2500 | H |
| Conventional amino phosphonic-sulfonic acid | Ethylenediamine | 5000 | H |
| Conventional carboxylic-phosphonic acid | Monoethanolamine | 2500 | H |

Analyzing the above experimental data of Table-3 of the compatibility test, the best solution which justify improvement in the calcium tolerance is measurements "C", $2^{nd}$ is "L", and the worst case is "H". Additionally, if the scale inhibitor fails in the calcium tolerance test at 1000 ppm, then higher dosages of that scale inhibitor, i.e. the dosage of 2000 ppm, 5000 ppm, or 7500 ppm of that scale inhibitor would also fail.

For example, if the Scale inhibitor demonstrates "L" condition as a result of test at the dosage of 1000 ppm of that scale inhibitor, then at higher dosages of 2500 ppm or at 5000 ppm that scale inhibitor would either demonstrate "L" condition or "H" condition, and it can't demonstrate "C" condition.

In other words, it may be said that higher the dosage of the scale inhibitor, worst would be the calcium tolerance.

The above analysis is supported by the experimental data of dosages of 1000 ppm, 2500 ppm and 5000 ppm of the comparative composition comprising Ethylenediamine salt of Conventional PAPEMP, and another comparative composition comprising Ethylenediamine salt of Conventional amino phosphonic-sulfonic acid.

As can be observed from the experimental data of the above Table-3, the comparative composition comprising Ethylenediamine salt of Conventional PAPEMP demonstrates a worst case as it demonstrates “H” condition, which means high precipitation occurs, and this behavior occurs even at higher dosages including 2500 ppm and 5000 ppm of this comparative composition comprising Ethylenediamine salt of Conventional PAPEMP.

Similarly, as can be observed from the experimental data of the above Table-3, the comparative composition comprising Ethylenediamine salt of Conventional amino phosphonic-sulfonic acid demonstrates a poor efficiency as it demonstrates “L” condition, which means low precipitation occurs, but this behavior occurs even at a higher dosages including 2500 ppm and 5000 ppm of this comparative composition comprising Ethylenediamine salt of Conventional amino phosphonic-sulfonic acid, because at the dosages of 2500 ppm and 5000 ppm, this particular composition demonstrates a worst case by demonstrating “H” condition, which means high precipitation occurs.

Based on the above analysis, it can be concluded that the compositions of the present invention, for example, the following compositions of the present invention comprising:

1. Acid salt of compound of structural Example 1;
2. Acid salt of compound of structural Example 2;
3. Acid salt of compound of structural Example 3;
4. Acid salt of compound of structural Example 4;
5. Acid salt of compound of structural Example 5;
6. Acid salt of compound of structural Example 6;
7. Acid salt of compound of structural Example 8;
8. Acid salt of compound of structural Example 9;
9. Acid salt of compound of structural Example 11;

demonstrate the best solution by demonstrating “C” condition, which means a clear solution is observed, i.e. no precipitation occurs.

On the contrary, the comparative composition comprising Acid salt of Conventional PAPEMP demonstrates a poor efficiency as it demonstrates “L” condition, which means low precipitation occurs, and based on the above analysis, this behavior occurs even at a higher dosages including 2500 ppm and 5000 ppm of this comparative composition comprising Acid salt of Conventional PAPEMP, because at the higher dosages of 2500 ppm and 5000 ppm, this particular composition would demonstrate a worst case by demonstrating “H”, which means high precipitation would occur.

Dynamic Efficiency Test 1

Scale inhibition test can be evaluated by stirred bottle test or modified bottle test. In a similar manner to standard bottle test, with the use of a magnetic stirrer, to employ a turbulent condition, in the bottles were added 50-50 mixture of the cationic and anionic brines. The test was carried out at a temperature of about 90° C. for about 15 minutes, and then metal ions concentration left in solution is monitored by inductively coupled plasma (ICP). Percent scale inhibition was determined comparing metal ion concentration found in a scaling blank and a non-scaling control solution, according to the following Formula-a, wherein:

CSI=Concentration of metal ion in sample (inhibitor present);

C0=Concentration of metal ion in unscaled sample (control); and

CB=Concentration of metal ion in scale sample (no inhibitor present—blank).

$$\text{Percent scale inhibition} = \frac{(CSI - CB) \times 100}{(C0 - CB)} \quad \text{Formula-a}$$

The results of scale inhibition are shown in Table-4.

All the examples and comparative products were added using a concentration of the Scale Inhibitor of about 9.4 ppm based on active acid.

TABLE 4

Efficiency by ICP with different products.
Efficiency Test

| Compound of | Percent scale inhibition (%) Ca | Sr | Ba |
|---|---|---|---|
| Example 1 | 49 | 43 | 54 |
| Example 2 | 43 | 56 | 10 |
| Example 3 | 100 | 100 | 85 |
| Example 4 | 48 | 82 | 64 |
| Example 5 | 19 | 33 | 74 |
| Example 6 | 48 | 24 | 74 |
| Example 8 | 64 | 30 | 74 |
| Example 9 | 48 | 27 | 64 |
| Example 11 | 49 | 27 | 100 |
| Conventional PAPEMP | 39 | 23 | 64 |
| Conventional amino phosphonic-sulfonic acid | 58 | 22 | 64 |
| Conventional carboxylic-phosphonic acid (PBTC) | 46 | 24 | 21 |

In the above Table-4, the concentration of the example scale Inhibitors (that is, the present scale Inhibitors) and of the comparative scale Inhibitors were same and only about 9.4 ppm based on the active acid.

As can be observed from the experimental data of the above Table-4, the present compositions comprising compound of example 1, 2, 3, 4, 5, 6, 8, 9, and 11 demonstrate substantially improved bivalent ions inhibition efficiency for the calcium (Ca) scale, the strontium (Sr) scale, and the barium (Ba) scale inhibition, preferably for the strontium (Sr) scale and the barium (Ba) scale inhibition.

Dynamic Efficiency Test 2

In order to obtain the performance data for scale inhibitor of the present invention, a dynamic scale loop (DSL) apparatus was employed. This method of performance evaluation was also carried out for synthetic brine detailed in Table 2. The brine pH was adjusted to about 6.5 and the test was carried out at a temperature of about 135° C. and a pressure of about 120 psi.

As an exemplary embodiment, the pH of the brine may be adjusted according to field specification, because synthetic brine is not always the same of brine in real condition.

All tests were conducted with a fluid flow rate of about 10 mL/min through a about 1 m stainless steel scaling coil with an internal diameter of about 0.5 mm.

The results are expressed in differential pressure (ΔP) as a function of time.

A fail for DSL test is when an increase in differential pressure (ΔP) across the test coil of about 1 psi is observed.

For comparative purposes, the conventional scale inhibitors were evaluated too.

The example and comparative products were added using a concentration of about 15.6 ppm based on active acid.

FIG. 1 shows the comparative dynamic scale loop (DSL) test results of salt of functionalized methylene phosphonates of amino-terminated oxyalkylates of the present invention, wherein the salt of functionalized methylene phosphonate of amino-terminated oxyalkylate is ethylenediamine salt of structural Formula-14;

and compared with the conventional amino phosphonic-sulfonic acid, conventional PAPEMP and blank sample (i.e., without scale inhibitor), wherein the conventional PAPEMP is polyamino polyether (ethane 2-amido-2-methylpropane sulfonic acid) methylene phosphonic acid and conventional compositions (Conventional amino phosphonic-sulfonic acid) and Conventional PAPEMP (commercially available sample), were replaced with "conventional functionalized amino phosphonate" to "conventional amino phosphonic-sulfonic acid".

As shown in FIG. 1, the ΔP was evaluated during the evaluation period of 60 minutes. As a result, it was confirmed that if the scale inhibitor was not added (blank), the scale tendency of synthetic brine was high and reached ΔP=1 across about 2.5 minutes. In addition, when conventional scale inhibitor was added such as, ethylenediamine salt of conventional amino phosphonic-sulfonic acid and ethylenediamine salt of conventional PAPEMP high scale tendency was shown and reached ΔP=1 across about 3.0 minutes and 11.0 minutes, respectively. On the other hand, when ethylenediamine salt of functionalized methylene phosphonates of amino-terminated oxyalkylates of the present invention was added, the baseline kept flirting and not showing scale tendency across 60.0 minutes.

Bivalent Tolerance:

In order to further evaluate the bivalent tolerance of the functionalized methylene phosphonate of amino-terminated oxyalkylate of the present invention, the composition comprising the compound of Formula-9, Formula-14, and Formula-15 were evaluated by a similar way according to the standard bottle test. For example, the sample was placed in an oven and heated at about 130° C., after about 22 hours, the visual observations are checked and bivalent ions left in solution was measured by the ICP. Percentage of bivalent ions tolerance of the composition was determined (re Table-5) comparing metal ion concentration found in a non-scaling control solution, according to the following Formula-b, wherein:

CSI=Concentration of metal ion in sample (inhibitor present); and

C0=Concentration of metal ion in unscaled sample (control).

$$\text{Bivalent ion tolerance} = \frac{(CSI)\times 100}{(C0)} \qquad \text{Formula-b}$$

TABLE 5

| Bivalent ion tolerance | | | | | | |
|---|---|---|---|---|---|---|
| Active acid | Active Compound | | % Bivalent Tolerance | | | |
| dosage (ppm) | of Composition | Salt | Ca | Sr | Ba | Mg |
| 1000 | Example 9 | Monoethanolamine | 91 | 92 | 92 | 86 |
| 5000 | Example 9 | Monoethanolamine | 90 | 94 | 88 | 85 |
| 1000 | Example 14 | Sodium | 100 | 100 | 99 | 100 |
| 5000 | Example 14 | Sodium | 98 | 100 | 100 | 99 |
| 1000 | Example 15 | Sodium | 100 | 100 | 100 | 100 |
| 5000 | Example 15 | Sodium | 100 | 98 | 100 | 98 |

It has been surprisingly and unexpectedly found that the functionalized methylene phosphonates of amino-terminated oxyalkylates, or a corresponding water-soluble salt thereof, or a N-oxide salt thereof, or a water-soluble N-oxide salt thereof as provided herein are capable of simultaneously providing several technical advantages, including high efficiency in dynamic efficiency test and bivalent ion tolerance. Compared to the conventional additives, for example the ethylenediamine salt of conventional amino phosphonic-sulfonic acid and the ethylenediamine salt of conventional PAPEMP, the functionalized methylene phosphonates of amino-terminated oxyalkylates, or a corresponding water-soluble salt thereof, or a N-oxide salt thereof, or a water-soluble N-oxide salt thereof of the present invention, surprisingly and unexpectedly demonstrated enhanced performance establishing their synergistic effect.

The invention claimed is:

1. A composition comprising functionalized methylene phosphonate of amino-terminated oxyalkylate, wherein the functionalized methylene phosphonate of amino-terminated oxyalkylate has a general Formula-I:

Formula-I

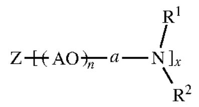

wherein:

Z is selected from hydrogen atom, etheric oxygen atom, hydroxyl, alkyl, aryl, cycloalkyl, heretocyclyl, hydrocarbylene, heterocarbylene, or an organoheteryl having from 1 to 6 carbons;

n is an integer or fractional integer;

A is a lower alkylene group;

a is a lower alkylene group;

x is integer having a value from 1 to 4;

$R^1$ and $R^2$ are independently selected from hydrogen, $—CH_2PO_3M_2$, and a functional group;

wherein n defines the number of oxyalkylene units in the functionalized methylene phosphonate of amino-terminated oxyalkylate;

wherein A is selected from methylene, ethylene, propylene, butylene, methyl ethylene, or a combination thereof;

wherein a is selected from methylene, ethylene, propylene, butylene, methyl ethylene, or ethyl ethylene;

characterized in that wherein the $R^1$ and $R^2$ of the functionalized methylene phosphonate of amino-terminated oxyalkylate having a general Formula-I has at least combination of —$CH_2PO_3M_2$ with one or more functional group, and the remaining is hydrogen;

wherein the functional group is selected from —$YCO_2M$, —$YSO_3M$, —$YCONM_2$, —YCN, or a combination thereof;

wherein Y in the functional group is independently selected from an hydrocarbylene, arylene or hetero-carbylene selected from methylene, ethylene, propylene, propenyl, 2-methyl-propylene, butylene or 2-hydroxy-propyl, 2-methyl-2-(propionamido) propane, phenylene;

wherein M is independently selected from hydrogen, an alkali metal, alkaline earth metal, ammonium salt, ammonium derivative or lower alkyl group, or a combination thereof;

wherein the $R^1$ and $R^2$ comprises:

a) from 15 mol % to 80 mol % of the —$CH_2PO_3M_2$ based on the total mol percent (mol %) of the $R^1$ and the $R^2$;

b) from 15 mol % to 50 mol % of the functional group based on the total mol percent (mol %) of the $R^1$ and the $R^2$; and c) the remaining is the hydrogen.

2. The composition as claimed in claim 1, wherein the functional group is selected from —$YCO_2M$, —$YSO_3M$, or a combination thereof.

3. The composition as claimed in claim 1, wherein the n on average varies from about 0.25 to about 75.

4. The composition as claimed in claim 1, wherein the n defines number of the oxyalkylene units in the functionalized methylene phosphonate of amino-terminated oxyalkylate.

5. The composition as claimed in claim 1, wherein the composition comprises the functionalized methylene phosphonate of amino-terminated oxyalkylate having a general Formula-I as its water-soluble salt as claimed in claim 1.

6. The composition as claimed in claim 5, wherein the water-soluble salt is prepared by neutralizing acid groups of the —$CH_2PO_3M_2$ and the functional group with a stoichiometric amount of a base salt.

7. The composition as claimed in claim 6, wherein the base salt comprises alkali metal, alkaline earth metal, ammonium, or ammonium derivative.

8. A composition comprising N-oxide salt of a functionalized methylene phosphonate of amino-terminated oxyalkylate having a general Formula-I, wherein the N-oxide salt has a general Formula-II:

Formula-I

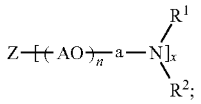

Formula-II

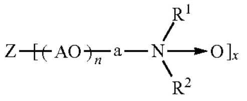

wherein

Z is selected from hydrogen atom, etheric oxygen atom, hydroxyl, alkyl, aryl, cycloalkyl, heretocyclyl, hydrocarbylene, heterocarbylene, or an organoheteryl having from 1 to 6 carbons;

n is an integer or fractional integer;

A is a lower alkylene group;

a is a lower alkylene group;

x is integer having a value from 1 to 4;

$R^1$ and $R^2$ are independently selected from hydrogen, —$CH_2PO_3M_2$, and a functional group;

wherein n defines the number of oxyalkylene units in the functionalized methylene phosphonate of amino-terminated oxyalkylate;

wherein A is selected from methylene, ethylene, propylene, butylene, methyl ethylene, or a combination thereof;

wherein a is selected from methylene, ethylene, propylene, butylene, methyl ethylene, or ethyl ethylene;

characterized in that wherein the $R^1$ and $R^2$ has at least combination of —$CH_2PO_3M_2$ with one or more functional group, and the remaining is hydrogen;

wherein the functional group is selected from —$YCO_2M$, —$YSO_3M$, —$YCONM_2$, —YCN, or a combination thereof;

wherein the Y in the functional group is independently selected from an hydrocarbylene, arylene or hetero-carbylene selected from methylene, ethylene, propylene, propenyl, 2-methyl-propylene, butylene or 2-hydroxy-propyl, 2-methyl-2-(propionamido) propane, phenylene; and wherein M is independently selected from hydrogen, an alkali metal, alkaline earth metal, ammonium salt, ammonium derivative or lower alkyl group, or a combination thereof.

9. The composition as claimed in claim 8, wherein the composition comprises the functionalized methylene phosphonate of amino-terminated oxyalkylate having a general Formula-I as its water-soluble salt of N-oxide as claimed in claim 8 and has a general Formula-II:

Formula-II

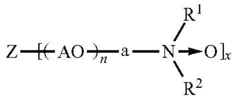

wherein Z, n, A, a, x, $R^1$ and $R^2$, and functional group and the Y and M, and combination of —$CH_2PO_3M_2$ with one or more functional group are same as of the general Formula-I.

10. The composition as claimed in claim 9, wherein the water-soluble salt of N-oxide is obtained by neutralizing the —$CH_2PO_3M_2$ and the functional group with a stoichiometric amount of a base salt.

11. The composition as claimed in claim 10, wherein the base salt comprises alkali metal, alkaline earth metal, ammonium, or ammonium derivative.

12. The composition as claimed in claim 1, wherein the composition comprises a one or more of a compound of a structural Formula 3 to 5, and 7 to 23, wherein the compound is:

having a structural Formula-3 having —$YSO_3H$ as a functionalized group:

Formula-3

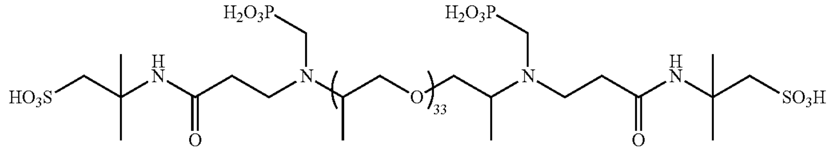

having a structural Formula-4 having —$YSO_3Na$ as a functionalized group:

Formula-4

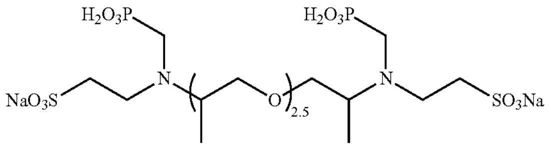

having a structural Formula-5 having —$YCO_2H$ as a functionalized group:

Formula-5

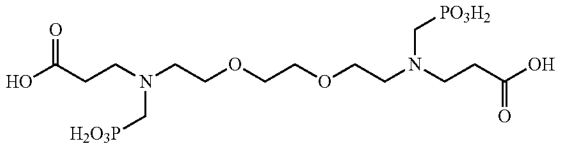

having a structural Formula-7 having —$YSO_3Na$ as a functionalized group:

Formula-7

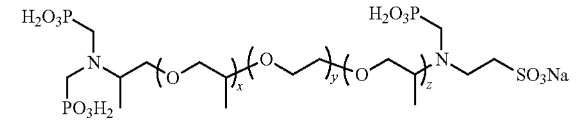

x + z = 3.6
y = 9 having a structural Formula-8 having —$YCO_2H$ as a functionalized group:

Formula-8

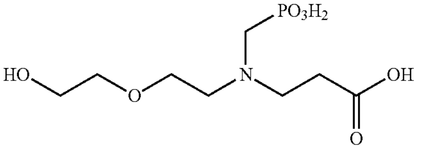

having a structural Formula-9 having —$YSO_3Na$ as a functionalized group:

Formula-9

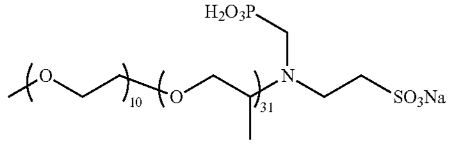

having a structural Formula-10 having —$YCO_2H$ as a functionalized group:

Formula-10

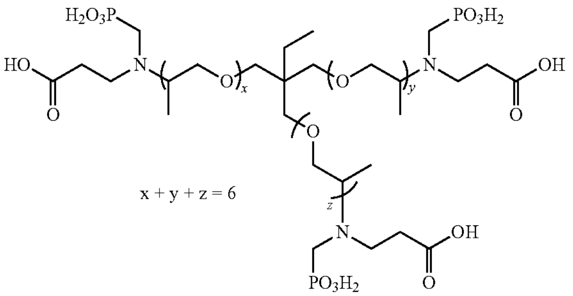

x + y + z = 6 having a structural Formula-11 having —$YCO_2H$ and —$YSO_3Na$ as functionalized groups:

Formula-11

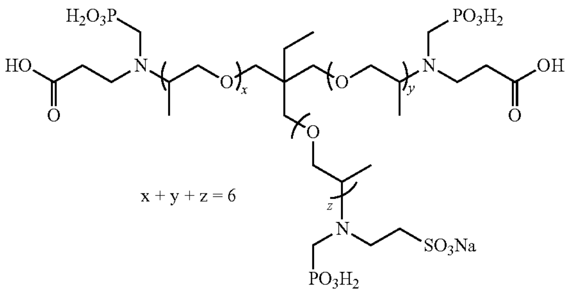

x + y + z = 6 having a structural Formula-12 having —$YCO_2H$ and —$YSO_3Na$ as functionalized groups:

Formula-12

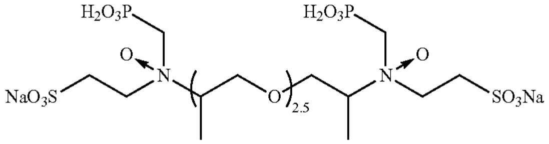

having a structural Formula-13 having —$YCO_2H$ as a functionalized group:

Formula-13

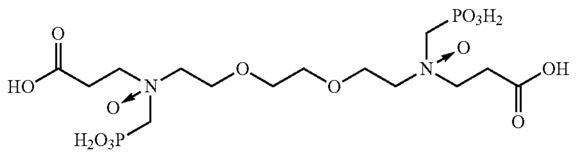

having a structural Formula-14 having —$YSO_3H$ as a functionalized group:

Formula-14

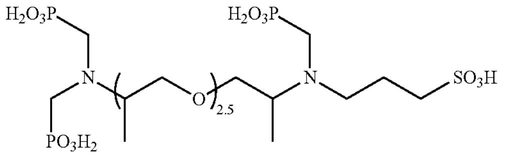

having a structural Formula-15 having —$YCO_2H$ as a functionalized group:

Formula-15

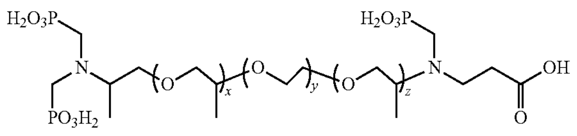

x + z = 12 y = 2 having a structural Formula-16 having —$YCO_2H$ as a functionalized group:

Formula-16

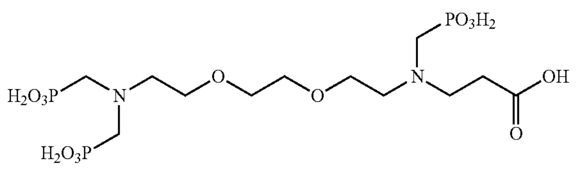

having a structural Formula-17 having —$YSO_3H$ as a functionalized group:

Formula-17

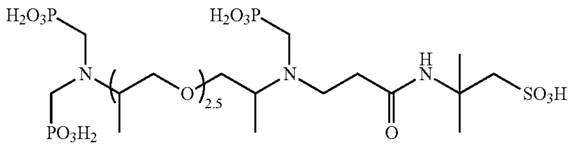

having a structural Formula-18 having —$YSO_3Na$ as a functionalized group:

Formula-18

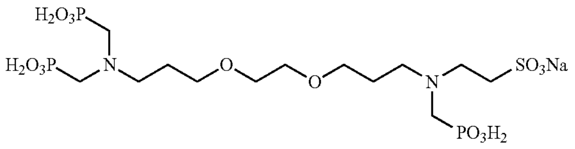

having a structural Formula-19 having —$YSO_3Na$ as a functionalized group:

Formula-19

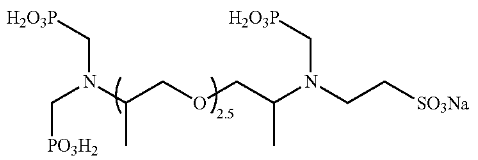

having a structural Formula-20 having —$YSO_3H$ as a functionalized group:

Formula-20

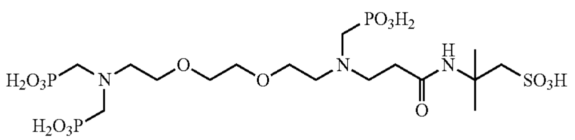

having a structural Formula-21 having —$YCO_2H$ as a functionalized group:

Formula-21

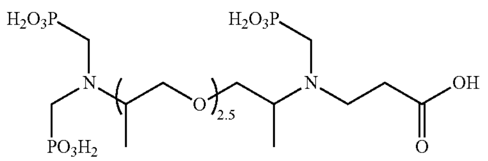

having a structural Formula-22 having —$YSO_3H$ as a functionalized group:

Formula-22

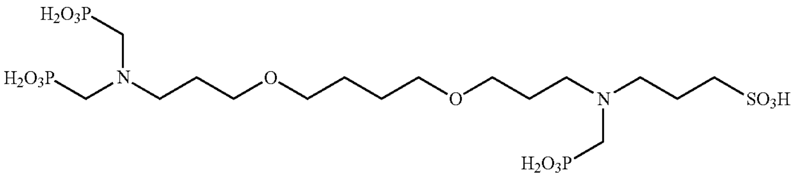

having a structural Formula-23 having —$YSO_3H$ as a functionalized group:

Formula-23

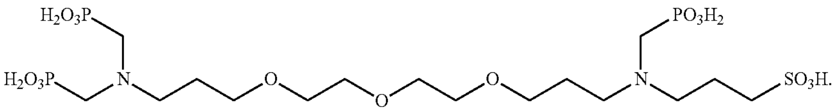

13. A method for eliminating or at least reducing formation of scales, wherein the method comprises a step of adding a composition comprising:

(a) the functionalized methylene phosphonate of amino-terminated oxyalkylate as claimed in claim 1;

(b) a water-soluble salt of the functionalized methylene phosphonate of amino-terminated oxyalkylate;

(c) a N-oxide salt of the functionalized methylene phosphonate of amino-terminated oxyalkylate; or (d) a water-soluble salt of N-oxide of the functionalized methylene phosphonate of amino-terminated oxyalkylate;

wherein the composition is added to a medium in an amount sufficient to eliminate or to reduce formation of the scales; and wherein the composition is added as a scale inhibitor for eliminating or at least reducing formation of the scales.

14. The method as claimed in claim 13, wherein the scales are formed due to deposition of alkaline earth metal cations comprising calcium, barium, strontium, magnesium, or a mixture thereof along with anions comprising sulfate, carbonate, bicarbonate, phosphate, silicate, sulfide, or a mixture thereof.

15. The method as claimed in claim 13, wherein the scales are formed due to deposition of calcium carbonate, calcium sulfate, barium sulfate, strontium sulfate, magnesium sulfate, or a mixture thereof.

16. The method as claimed in claim 13, wherein the medium comprises alkaline earth metal cation comprising calcium, barium, strontium, magnesium, or a mixture thereof along with anion comprising sulfate, carbonate, bicarbonate, phosphate, silicate, sulfide, or a mixture thereof.

17. A method for using a composition comprising:

(a) the functionalized methylene phosphonate of amino-terminated oxyalkylate as claimed in claim 1;

(b) a water-soluble salt of the functionalized methylene phosphonate of amino-terminated oxyalkylate;

(c) a N-oxide salt of the functionalized methylene phosphonate of amino-terminated oxyalkylate; or (d) a water-soluble salt of N-oxide of the functionalized methylene phosphonate of amino-terminated oxyalkylate;

as a threshold scale inhibitor, a chelation agent, or a sequestration agent in oilfield application;

wherein the composition is added to a medium in an amount sufficient to inhibit scale or to reduce formation of the scales, or to form chelate complex, or to form a water-soluble complex with a metal; and wherein the composition is added as a threshold scale inhibitor, a chelation agent, or a sequestration agent.

18. A method for using a composition comprising:

(a) the functionalized methylene phosphonate of amino-terminated oxyalkylate as claimed in claim 1;

(b) a water-soluble salt of the functionalized methylene phosphonate of amino-terminated oxyalkylate;

(c) a N-oxide salt of the functionalized methylene phosphonate of amino-terminated oxyalkylate; or (d) a water-soluble salt of N-oxide of the functionalized methylene phosphonate of amino-terminated oxyalkylate;

as a dispersant in industrial cooling water, boiler water, oil well process water and other process waters;

wherein the method comprises a step of adding the composition as a dispersant to the industrial cooling water, the boiler water, the oil well process water, or the other process waters in an amount effective to disperse scales so as to avoid formation of insoluble precipitates and maintain system cleanliness.

19. A method for using a composition comprising:

(a) the functionalized methylene phosphonate of amino-terminated oxyalkylate as claimed in claim 1;

(b) a water-soluble salt of the functionalized methylene phosphonate of amino-terminated oxyalkylate;

(c) a N-oxide salt of the functionalized methylene phosphonate of amino-terminated oxyalkylate; or (d) a water-soluble salt of N-oxide of the functionalized methylene phosphonate of amino-terminated oxyalkylate;

as a bivalent ion tolerance;

wherein the method comprises a step of adding the composition as the bivalent ion tolerant agent to a medium containing bivalent ions in an amount effective to maintain solubility and prevent precipitation in the presence of the bivalent ions.

20. The method as claimed in claim 19, wherein the bivalent ion is selected from a group comprising: calcium (Ca), strontium (Sr), barium (Ba), magnesium (Mg), or a mixture thereof.

* * * * *